US008114034B2

(12) United States Patent
Ikeuchi et al.

(10) Patent No.: US 8,114,034 B2
(45) Date of Patent: *Feb. 14, 2012

(54) WALKING ASSISTING DEVICE

(75) Inventors: Yasushi Ikeuchi, Wako (JP); Tatsuya Noda, Wako (JP); Jun Ashihara, Wako (JP); Yutaka Hiki, Wako (JP)

(73) Assignee: Honda Motor Co., Ltd., Tokyo (JP)

( * ) Notice: Subject to any disclaimer, the term of this patent is extended or adjusted under 35 U.S.C. 154(b) by 1182 days.

This patent is subject to a terminal disclaimer.

(21) Appl. No.: 11/816,348

(22) PCT Filed: May 29, 2006

(86) PCT No.: PCT/JP2006/310658
§ 371 (c)(1),
(2), (4) Date: Aug. 15, 2007

(87) PCT Pub. No.: WO2006/126711
PCT Pub. Date: Nov. 30, 2006

(65) Prior Publication Data
US 2008/0156363 A1    Jul. 3, 2008

(30) Foreign Application Priority Data

May 27, 2005  (JP) .................................. 2005-155329
Aug. 2, 2005  (JP) .................................. 2005-223803

(51) Int. Cl.
*A61H 1/00* (2006.01)
*A61H 3/00* (2006.01)
(52) U.S. Cl. ................................. 601/5; 602/16; 602/23

(58) Field of Classification Search ................. 601/5, 23, 601/26, 27, 33, 34, 35; 602/5, 16, 23, 26, 602/27; 482/51, 66, 74–79; 135/65, 67
See application file for complete search history.

(56) References Cited

U.S. PATENT DOCUMENTS 4,872,665 A    10/1989   Chareire
7,662,120 B2 *  2/2010   Hiki ................................ 602/16

FOREIGN PATENT DOCUMENTS

| DE | 4408351 A1 | 9/1994 |
| EP | 1637113    | 3/2006 |
| FR | 2802801    | 6/2001 |
| GB | 2278041    | * 11/1994 |
| JP | 04-352961  | 12/1992 |

(Continued)

*Primary Examiner* — Quang D Thanh
(74) *Attorney, Agent, or Firm* — Rankin, Hill & Clark LLP

(57) ABSTRACT

A walking aid apparatus comprising a sitting member which a user sits astride and leg links each coupled to a connection provided on the undersurface of the sitting member in such a way as to be free to swing in the forward/backward direction, which improves the stability of the sitting member. The connection is adapted in such a way that a forward/backward swinging fulcrum of the leg links is located above the sitting member. More specifically, the connection is provided with an arc-shaped guide track longitudinal in the forward/backward direction and having the center of curvature above the sitting member, so that each of the leg links swings along the guide track in the forward/backward direction. If the leg links are allowed to swing freely also in the lateral direction, preferably the lateral swinging fulcrum of the leg links is also located above the sitting member.

12 Claims, 8 Drawing Sheets

FOREIGN PATENT DOCUMENTS

| | | |
|---|---|---|
| JP | 05-329186 | 12/1993 |
| JP | 07-112035 | 5/1995 |
| JP | 2003-220102 | 8/2003 |
| JP | 2004-236998 | 8/2004 |
| WO | 01/19461 A1 | 3/2001 |
| WO | 2004103249 | 12/2004 |

* cited by examiner

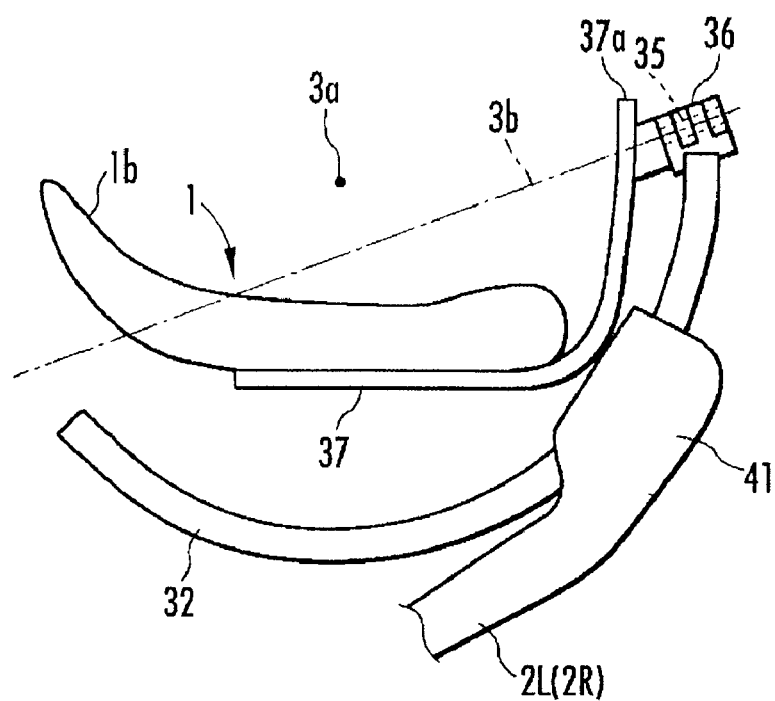

WALKING ASSISTING DEVICE

BACKGROUND OF THE INVENTION

The present invention relates to a walking aid apparatus for aiding a user in walking.

BACKGROUND ART

Conventionally, there is already known this type of walking aid apparatus that is provided with a waist support belt attached around a user's waist with a pair of right and left leg links coupled to each other via first joints corresponding to the hip joints of a person on both sides of the waist support belt in the lateral direction (for example, refer to Japanese publication of patent application No. 2003-220102). In this apparatus, each leg link is formed of a freely bending and stretching link, which has a second joint corresponding to the knee joint of the person vertically in the middle of the leg link, with the lower end of the leg link being coupled to a landing member attached to a user's foot. In addition, the walking aid apparatus includes a driving source for the second joint to generate bearing power for supporting a part of a user's weight by means of a rotational drive of the second joint caused by the driving source.

In the above conventional embodiment, there is a need to attach the waist support belt tightly around the waist in order to transmit the bearing power reliably to a user's body. Therefore, the user becomes susceptible to a feeling of being bound. Furthermore, since the first joints of the right and left leg links are projecting on both sides of the user's waist, the user often hits his hands against the first joints or the upper parts of the leg links coupled to the first joints when swinging his arms while walking inconveniently.

Moreover, there is conventionally known a walking aid apparatus wherein four leg links each having a wheel at the lower end thereof are vertically attached to a frame, which is surrounding a user from the back side to laterally both sides of the user, and wherein the frame is equipped with a saddle-like sitting member which the user sits astride to detect a force applied by the user to the sitting member in order to drive the wheels in such a way that the force is a given target value (for example, refer to Japanese Patent Gazette No. 3156367).

Although this embodiment reduces the user's feeling of being bound, the apparatus is large in size and cannot be used in a small place. Furthermore, the user often hits his hands against the frame when swinging his arms while walking. Therefore, it cannot improve the usability.

As set forth in the above, there are various problems in the conventional walking aid apparatuses. Therefore, the inventor et al of the patent application concerned came up with the idea of coupling the leg links to connections provided on the undersurface of the sitting member which the user sits astride. According thereto, the bearing power of the leg links can be reliably transmitted from under the crotch to the body of the user. Moreover, the user only needs to sit astride the sitting member, which reduces the user's feeling of being bound. In addition, since the connections are provided on the undersurface of the sitting member, the connections and the upper parts of the leg links coupled to them are located under the user's crotch. Therefore, the user does not hit his hands against the connections and the upper parts of the leg links when swinging his arms while walking, thus allowing the user to swing the arms freely. Furthermore, the apparatus is small in size, unlike the conventional embodiment having the frame surrounding the user, and therefore it can be used in a small place. Combined with the reduced feeling of being bound and the achievement of freely swinging the arms described above, the usability is remarkably improved.

The connections on the undersurface of the sitting member are desirably adapted to allow the leg links to be free to swing in the forward/backward direction and be also free to swing in the lateral direction so that the user can swing his legs outward. In this instance, it is generally conceivable that the connections are each adapted to have the axis of abscissa with a lateral axis line and the axis of ordinate with a forward/backward axis line, so that the leg links are free to swing in the forward/backward direction with the axis of abscissa taken as a fulcrum and the leg links are free to swing in the lateral direction with the axis of ordinate taken as a fulcrum.

If the user bends forward his upper body and thereby the action point of the weight of the user's upper body relative to the sitting member is misaligned forward of the forward/backward swinging fulcrum of the leg links, the sitting member is affected by an rotation moment in the direction of inclining the sitting member forward and downward around the forward/backward swinging fulcrum of the leg links. At this point, if the leg links are free to swing in the forward/backward direction with the fulcrum as the axis of abscissa provided in the connection members on the undersurface of the sitting member as described above, the forward/backward swinging fulcrum (the axis of abscissa) of the leg links is located below the sitting member and therefore the forward and downward inclination of the sitting member displaces the action point of the weight in the forward direction of the forward/backward swinging fulcrum of the leg links, which increases the anteroposterior distance between the fulcrum and the action point of the weight and also increases the rotation moment applied to the sitting member. As a result, the sitting member inclines increasingly forward and downward and is misaligned backward with respect to the user, by which in some cases the sitting member is detached from the user's crotch backward. Moreover, if the leg links are free to swing in the lateral direction with the fulcrum as the axis of ordinate provided in the connection members on the undersurface of the sitting member as described above, the lateral swinging fulcrum (the axis of ordinate) of the leg links is located below the sitting member and therefore the sitting member is significantly inclined in the lateral direction if the action point of the weight is misaligned even slightly in the lateral direction with respect to the lateral swinging fulcrum of the leg links.

In view of the above problems, it is an object of the present invention to provide a compact and easy-to-use walking aid apparatus having a sitting member, which has improved stability in spite of leg links coupled to connections on the undersurface of the sitting member.

SUMMARY OF THE INVENTION

The present invention relates to a walking aid apparatus comprising a sitting member which a user sits astride and a leg link coupled to a connection provided on the undersurface of the sitting member. Where the leg link is coupled to the sitting member in such a way as to be free to swing in a forward/backward direction via the connection in order to achieve the above object, the connection is adapted in such a way that a forward/backward swinging fulcrum of the leg link is located above the sitting member. Where the leg link is coupled to the sitting member in such a way as to be free to swing in the lateral direction via the connection, the connection is adapted in such a way that the lateral swinging fulcrum of the leg link is located above the sitting member. Furthermore, where the leg link is coupled to the sitting member in such a way as to be free to swing in the forward/backward direction and in the lateral direction via the connection, the connection is adapted in such a way that the forward/backward swinging fulcrum and the lateral swinging fulcrum of the leg link are located above the sitting member.

Where the forward/backward swinging fulcrum of the leg link is located above the sitting member as described above, the action point of the weight is displaced backward under the forward/backward swinging fulcrum of the leg link if the action point of the weight of the user's upper body relative to the sitting member is misaligned forward of the forward/backward swinging fulcrum of the leg link and the sitting member inclines forward and downward. Therefore, the anteroposterior distance between the fulcrum and the action point of the weight decreases, which also decreases the rotation moment applied to the sitting member. Thereafter, when the action point of the weight is displaced up to the position just under the forward/backward swinging fulcrum of the leg link, the rotation moment applied to the sitting member becomes zero, which stabilizes the sitting member in this state. The sitting member thus automatically converges on the stable state in this way, which thereby prevents the sitting member from being misaligned in the forward/backward direction under the user's crotch.

Furthermore, when the lateral swinging fulcrum of the leg link is located above the sitting member, the action point of the weight is displaced laterally inward under the lateral swinging fulcrum of the leg link if the action point of the weight is misaligned laterally outward of the lateral swinging fulcrum of the leg link and the sitting member inclines laterally, and thereby the lateral distance between the fulcrum and the action point of the weight decreases. Therefore, the rotation moment applied to the sitting member decreases, too. Thereafter, when the action point of the weight is displaced up to the position just under the lateral swinging fulcrum of the leg link, the rotation moment applied to the sitting member becomes zero, which stabilizes the sitting member in this state.

Thus, according to the present invention, the stability of the sitting member can be improved in spite of the leg link coupled to the connection on the undersurface of the sitting member and therefore a compact and easy-to-use walking aid apparatus can be achieved.

The simplest means for bringing the forward/backward swinging fulcrum of the leg link located above the sitting member is a connection member provided with an arc-shaped guide track longitudinal in the forward/backward direction and having the center of curvature above the sitting member, with the upper end of the leg link being movably engaged with the guide track. According thereto, the leg link swings in the forward/backward direction along the guide track and the center of curvature of the guide track acts as the forward/backward swinging fulcrum of the leg link.

Where the leg link is composed of a freely bending and stretching link having a rotary joint in the middle thereof or a retractable link having a direct acting joint in the middle thereof, it is possible to generate bearing power for supporting at least a part of the user's weight by providing biasing means for biasing the joint in the stretching direction (in the direction of pushing up the sitting member). Preferably, however, a driving source should be provided for driving the joint located in the middle of the leg link. According thereto, it is possible to aid the user in walking properly by generating bearing power according to a load on the user's foot with the control of the driving source.

Moreover, if the upper end of the leg link movably engages with an arc-shaped guide track longitudinal in the forward/backward direction and having the center of curvature above the sitting member and if the leg link is composed of a freely bending and stretching link having a rotary joint in the middle thereof, it is desirable to adapt the upper end of the leg link so as to engage with a portion of the guide track located backward of a line between the middle joint and the center of curvature (the forward/backward swinging fulcrum of the leg link) of the guide track. This enables securing the forward swinging stroke of the leg link that follows the forward swinging motion of a user's leg without a need for a guide track particularly long in the forward direction. Therefore, the connection can be reduced in size advantageously.

BRIEF DESCRIPTION OF THE DRAWINGS

FIG. 10 is a perspective diagram of a first joint according to a fourth embodiment.

DETAILED DESCRIPTION OF THE INVENTION

Figure 1:
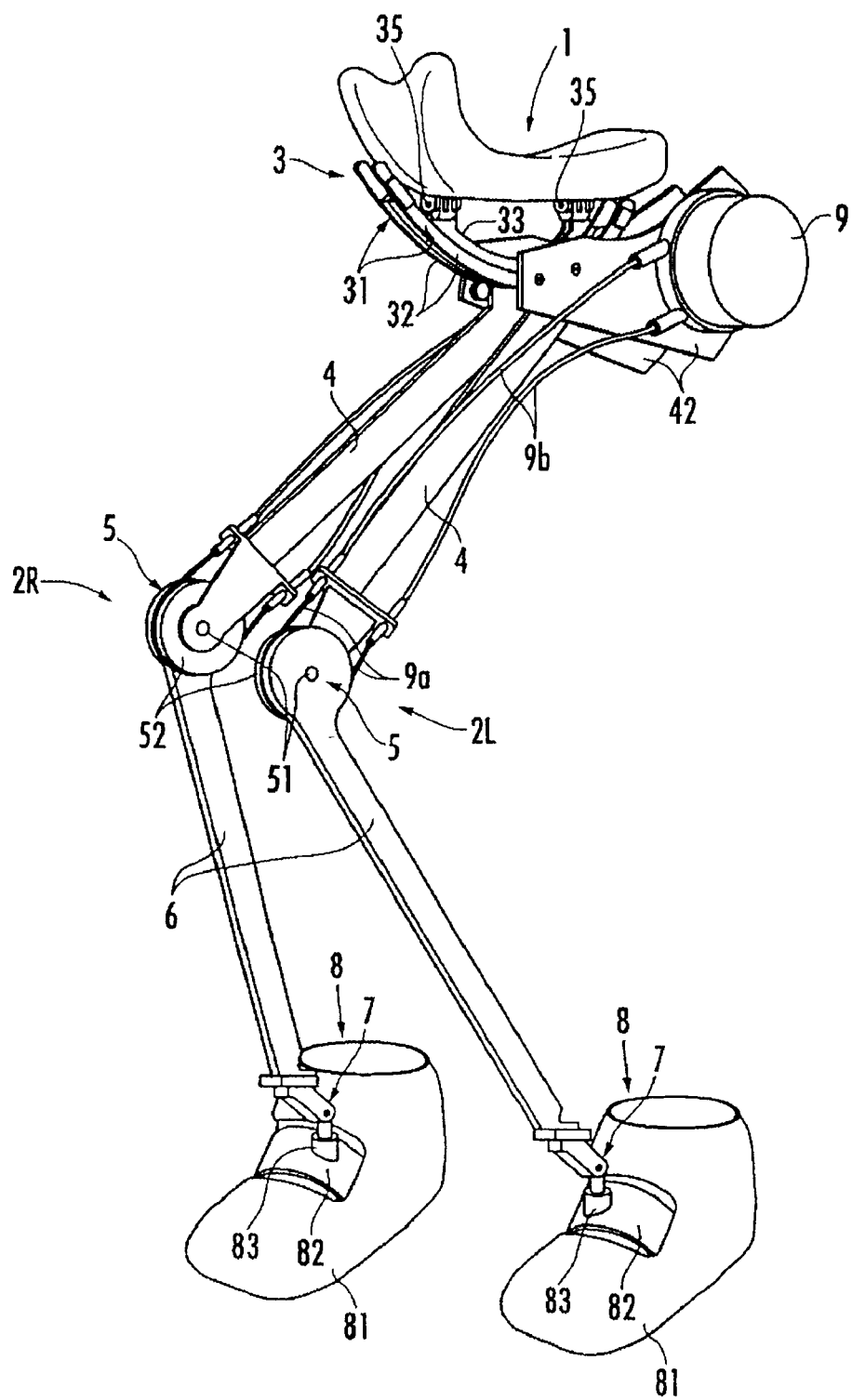
FIG. 1 is a perspective diagram of a walking aid apparatus according to a first embodiment of the present invention.
Figure 2:
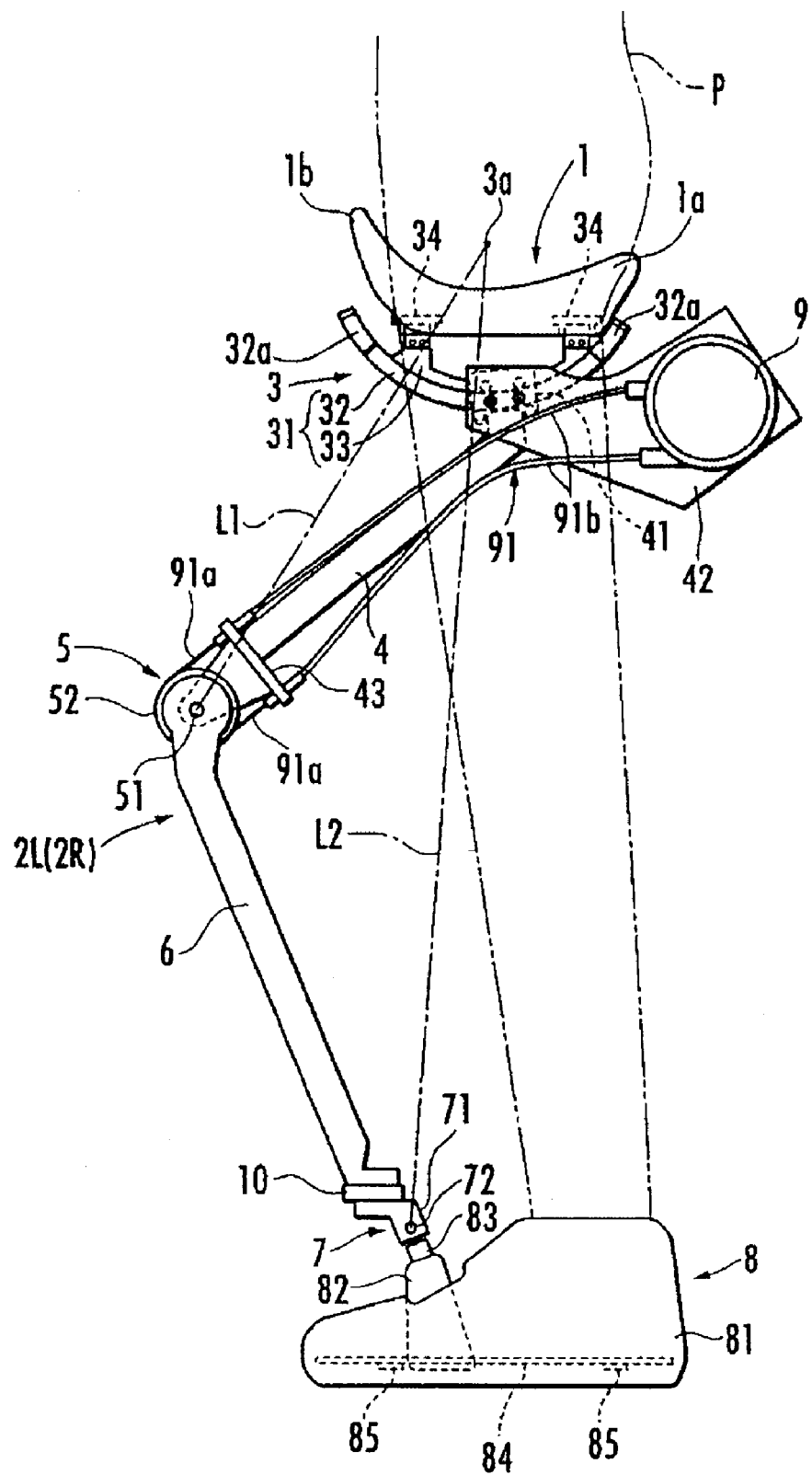
FIG. 2 is a side view of the walking aid apparatus according to the first embodiment.
Figure 3:
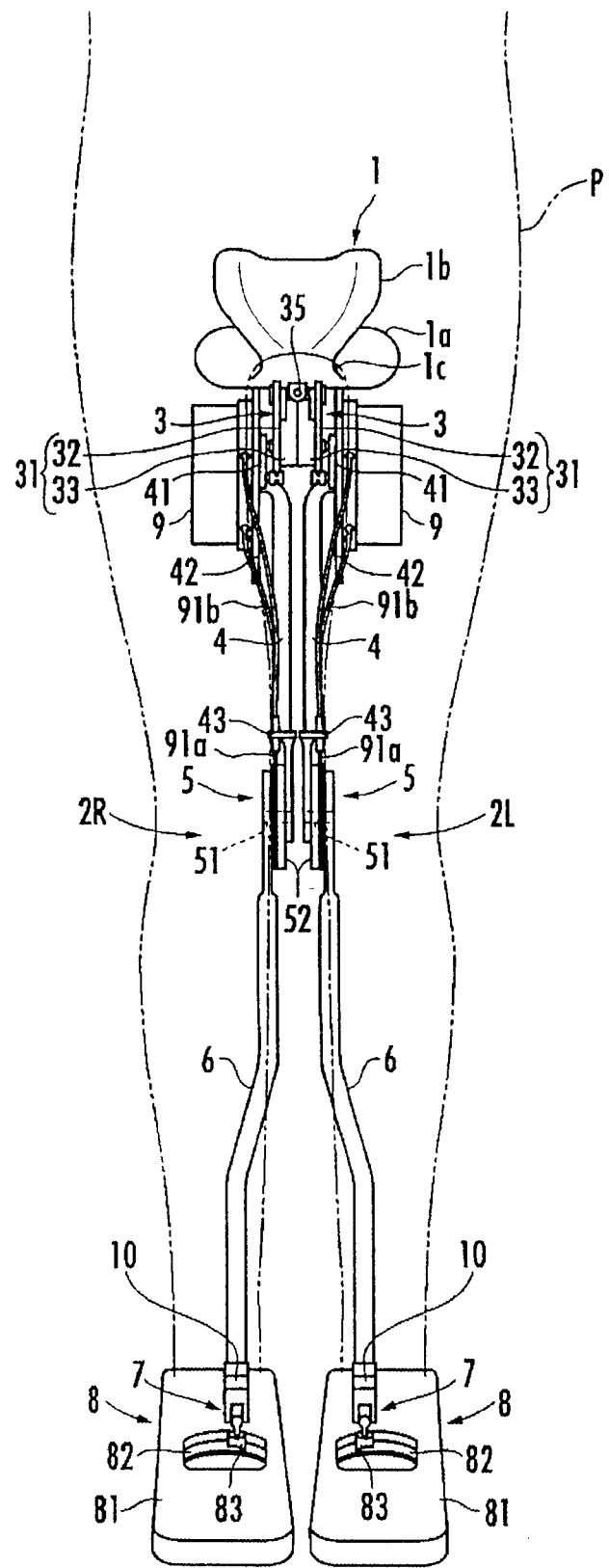
FIG. 3 is a front view of the walking aid apparatus according to the first embodiment.

A walking aid apparatus according to preferred embodiments of the present invention will be described hereinafter. As shown in FIG. 1 to FIG. 3, the walking aid apparatus includes a sitting member 1 serving as a load transmit section which a user P sits astride and a pair of left and right leg links 2L and 2R attached under the sitting member 1.

The leg links 2L and 2R are each composed of a freely bending and stretching link having a first link 4 coupled to a first joint 3 functioning as a connection provided on the undersurface of the sitting member 1 and a second link 6 coupled to the lower end of the first link 4 via a rotary second joint 5. In addition, the lower end of the second link 6 is coupled to a landing member 8 attached to each of the user's right and left feet via a third joint 7. Furthermore, the leg links 2L and 2R are each equipped with a driving source 9 for the second joint 5. Then, the driving source 9 is used to rotationally drive the second joint 5 to apply a force in a stretching direction of increasing the distance between the landing member 8 and the sitting member 1 to each of the leg links 2L and 2R in order to generate bearing power for supporting at least a part of the user's weight (hereinafter, referred to as a weight relief assist force) The weight relief assist force generated in each of the leg links 2L and 2R is transmitted to the body of the user P via the sitting member 1 and the load on the leg of the user P is thereby reduced.

The user P can use the walking aid apparatus according to this embodiment only by wearing the landing members 8 on the feet and sitting on the sitting member 1, without having the feeling of being bound almost at all. In addition, the first joints 3 and the first links 4 of the leg links 2L and 2R are located under the crotch of the user P and therefore the user P does not hit his hands against the first joints 3 and the first links 4 when swinging his arms while walking, by which the user P can swing the arms freely. Moreover, the apparatus is small in size and can be used in a small place, by which the usability is remarkably improved in addition to the reduced feeling of being bound and the achievement of freely swinging the arms.

Figure 4:
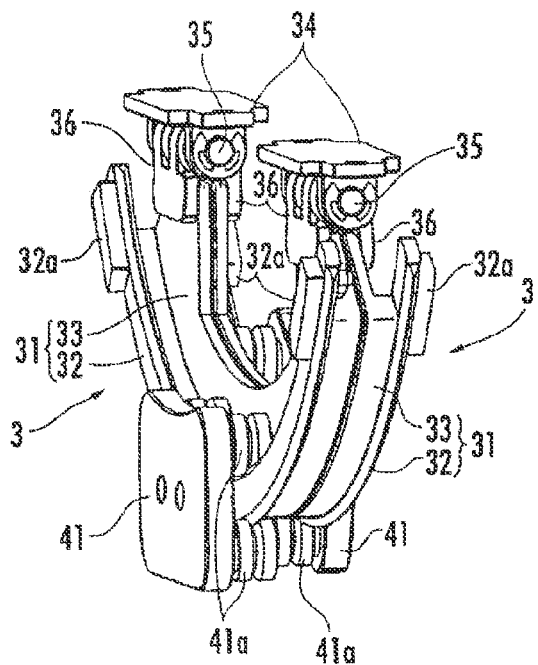
FIG. 4 is a perspective diagram of a first joint of the walking aid apparatus according to the first embodiment.
Figure 5:
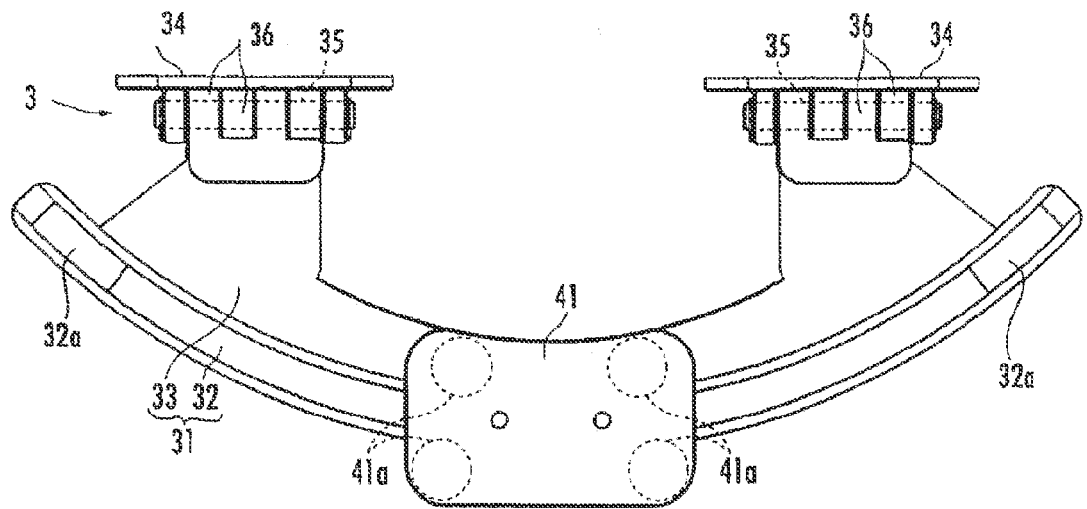
FIG. 5 is a side view of the first joint of the walking aid apparatus according to the first embodiment.

The first joints 3 for the leg links 2L and 2R are each composed of a joint member 31 including an arc-shaped guide track 32 longitudinal in the forward/backward direction and a support plate 33 for supporting the guide track 32 as shown in FIG. 4 and FIG. 5. While the guide track 32 is composed of an arc-shaped rail in this embodiment, it can also be composed of an arc-shaped groove formed in the support plate 33. At the upper end of the first link 4 of each of the leg links 2L and 2R, there is provided a slider 41 having vertical pairs of rollers 41a with the guide track 32 sandwiched therebetween vertically from both sides, so that the slider 41 movably engages with the guide track 32 via the rollers 41a. In this way, the leg links 2L and 2R swing in the forward/backward direction around the center of curvature of the guide track 32 and the forward/backward swinging fulcrum of the leg links 2L and 2R functions as the center of curvature of the guide track 32.

As shown in FIG. 2, the center of curvature of the guide track 32, namely the forward/backward swinging fulcrum 3a of the leg links 2L and 2R is located above the sitting member 1. If the user P bends his upper body forward or the like at this moment and thereby the action point of the weight of the upper body of the user P relative to the sitting member 1 is misaligned forward of the forward/backward swinging fulcrum 3a of the leg links 2L and 2R, the sitting member 1 inclines forward and downward. If the sitting member 1 continues to incline further, it is misaligned backward relative to the user P. In this embodiment, however, the action point of the weight is displaced backward under the swinging fulcrum 3a together with the forward and downward inclination of the sitting member 1 and thereby the anteroposterior distance between the fulcrum 3a and the action point of the weight decreases, which decreases the rotation moment applied to the sitting member 1. Thereafter, the rotation moment applied to the sitting member 1 becomes zero when the action point of the weight is displaced up to the position just under the swinging fulcrum 3a, which stabilizes the sitting member 1 in this state. Since the sitting member 1 automatically converges on the stable state in this way, it is possible to prevent the sitting member 1 from being misaligned in the forward/backward direction under the crotch of the user P.

In addition, the slider 41, which is the upper end of each of the leg links 2L and 2R, engages with a part of the guide track 32, which is located backward of a line L1 between the second joint 5 of each of the leg links 2L and 2R and the forward/backward swinging fulcrum 3a (the center of curvature of the guide track 32) of each of the leg links 2L and 2R. This secures a forward swinging stroke of each of the leg links 2L and 2R that follows the forward swinging motion of the leg of the user P without a need for the guide track 32 being particularly long in the forward direction. In addition to the above, a stopper 32a is attached to each of the forward and backward ends of the guide track 32 in order to prevent the first links 4 from being uncoupled.

Furthermore, the joint member 31, which is a component of each of the first joint 3 for each of the left and right leg links 2L and 2R, is pivotally supported in such a way as to be free to swing in the lateral direction by spindles 35 and 35 each having a forward/backward axis line, with the spindles supported by a pair of front and back support blocks 34 and 34 attached in the laterally center of the undersurface of the sitting member 1, via hinge members 36 and 36 attached to the upper front and back ends of the support plate 33. Therefore, the first joint 3 has the degree of freedom of allowing the leg links 2L and 2R to swing in the lateral direction as well as the degree of freedom of allowing the leg links 2L and 2R to swing in the forward/backward direction, by which the user P can swing outward.

Furthermore, the joint member 31 for the left leg link 2L and the joint member 31 for the right leg link 2R are pivotally supported by the common spindle 35. In other words, the lateral swinging fulcrum of the left leg link 2L and the lateral swinging fulcrum of the right leg link 2R are located on the same forward/backward axis line. In a one-leg supporting state, the weight of the leg link on the side of the idling leg (the leg whose foot is spaced from the floor) (or an assist force if there is generated the assist force for aiding in lifting the idling leg by applying a force to the leg link in the direction of bending it as described later) is applied to the sitting member 1 via the lateral swinging fulcrum of the leg link. If the lateral swinging fulcrum of the left leg link 2L is spaced apart from the lateral swinging fulcrum of the right leg link, the sitting member 1 is affected by a rotation moment generated around the lateral swinging fulcrum of the leg link on the side of the supporting leg (the leg whose foot is in contact with the floor) due to the weight of the leg link on the side of the idling leg in the one-leg supporting state, which causes the rolling of the sitting member 1.

On the other hand, the lateral swinging fulcrum of the leg link on the side of the idling leg at the place where the weight of the leg link on the side of the idling leg is applied is located on the same axis line (the spindle 35) as one for the lateral swinging fulcrum of the leg link on the side of the supporting leg in the one-leg supporting state in this embodiment. Thereby, the sitting member 1 is not affected by the rotation moment generated around the lateral swinging fulcrum of the leg link on the side of the supporting leg. Therefore, it is possible to prevent the rolling of the sitting member 1 in the one-leg supporting state. The weight of the leg link on the side of the idling leg is transmitted to the floor via the leg link on the side of the supporting leg, and the sitting member 1 is not affected by the weight of the leg link on the side of the idling leg.

Moreover, the leg links 2L and 2R are each formed in such a length that the second joint 5 is bent in such a way as to project forward of a reference line L2 also when the user P is standing upright, where the reference line L2 (see FIG. 2) is a line between the forward/backward swinging fulcrum 3a of the leg links 2L and 2R in the first joint 3 and the third joint 7. In addition, the height of the sitting member 1 can be automatically adjusted to fit the user P with the control of the driving source 9. Therefore, there is no need to make a dedicated apparatus for an individual or to adjust the lengths of the leg links, and the walking aid apparatus can reduce cost due to its versatility.

In the upright state of the user P, the reference line L2 is almost vertical at this moment and almost all parts of each of the leg links 2L and 2R including the second joint 5 are located forward of the third joint 7. Therefore, if the driving source 9 is placed on the same axis as the second joint 5, the weight of each of the leg links 2L and 2R including the driving sources 9 causes a large swing moment in a forward tilting direction around the third joint 7 when the user P is standing upright. Thereafter, the swing moment causes a forward push force to act on the sitting member 1. Furthermore, when the user P swings his leg forward, a backward swing moment occurs around the forward/backward swinging fulcrum 3a in the first joint 3 in each of the leg links 2L and 2R, thereby providing a resistance to the forward swinging of the leg. If the driving source 9 is placed on the same axis as the second joint 5, the moment of inertia of each of the leg links 2L and 2R around the first joint 3 increases, by which the legs of the user P feel heavy while walking due to the moments of inertia of the leg links 2L and 2R applied to the legs.

Therefore, in this embodiment, there is attached an overhanging section 42 made of a board member projecting backward, which is the anteroposterior opposite direction of the second joint 5 relative to the reference line L2, to the slider 41 at the end on the side of the first joint 3 in each of the leg links 2L and 2R, namely at the upper end of the first link 4, and the driving source 9 is mounted on the overhanging section 42. Thereby, when the user P is standing upright, the reverse swing moment generated by the weight of the driving source 9 diminishes the swing moment in the forward tilting direction around the third joint 7 generated in each of the leg links 2L and 2R by the weight of each of the leg links 2L and 2R excluding the driving source 9. More specifically, the driving source 9 functions as a counterweight to reduce the entire swing moment of each of the leg links 2L and 2R including the driving source 9. In consequence, the forward push force applied to the sitting member 1 diminishes, too, and thereby the stability is improved.

Furthermore, when the user P swings his leg forward, the forward swing moment occurs around the forward/backward swinging fulcrum 3a of the leg links 2L and 2R due to the weight of the driving source 9 and this moment assists the leg in swinging forward. Therefore, it is possible to eliminate the resistance to the forward swinging of the leg, which becomes a problem when the leg links 2L and 2R are bent with the second joint 5 projecting forward of the reference line L2. Additionally the distance between the driving source 9 as a heavy load and the swinging fulcrum 3a decreases, which diminishes the moments of inertia of the leg links 2L and 2R around the first joint 3. Therefore, it is possible to prevent the legs of the user P from feeling heavy while walking due to the moments of inertia of the leg links 2L and 2R applied to the legs.

The weight relief assist force acts on a line approximately consistent with the reference line L2, when viewed from lateral perspective. If the slider 41 at the upper end of each of the leg links 2L and 2R here engages with a portion of the guide track 32, which corresponds to the line L1 between the second joint 5 of each of the leg links 2L and 2R and the forward/backward swinging fulcrum 3a of the leg links 2L and 2R, the slider engaging portion of the guide track 32 is largely offset forward with respect to the line of action of the weight relief assist force, which increases a moment caused by the weight relief assist force acting on the guide track 32 via the slider 41. Therefore, there is a need to increase the rigidity of the guide track 32 and it is hard to achieve a reduction in size and weight of the first joint 3. On the other hand, in this embodiment, the slider 41 at the upper end of each of the leg links 2L and 2R engages with a portion of the guide track 32 located backward of the line L1 between the second joint 5 of each of the leg links 2L and 2R and the forward/backward swinging fulcrum 3a of the leg links 2L and 2R as described above. This reduces the offset of the slider engaging portion of the guide track 32 with respect to the line of action of the weight relief assist force, thereby reducing the moment caused by the weight relief assist force applied to the guide track 32 via the slider 41. Therefore, the first joint 3 can be reduced in size and weight.

The driving force generated by the driving source 9 is transmitted to the second joint 5 via driving force transmission means 91. As the driving force transmission means 91, it is possible to use a parallel linkage with a link coupled in parallel to the first link 4 or a hydraulic transmission mechanism with a hydraulic cylinder in a portion apart from the second joint 5 of the second link 6. In this embodiment, however, the driving force transmission means 91 is composed of a wire transmission mechanism with a wire 91a between the second joint 5 and the driving source 9 for a reduction in weight and cost.

The details thereof are as described below. More specifically, two wires 91a are led out from the driving source 9: one wire 91a is paid out from the driving source 9, while the other wire 91a is drawn into the driving source 9. The driving source 9 includes an electric motor and a drive pulley for the wire 91a driven by the motor. The wires 91a and 91a are passed through two guide tubes 91b and 91b provided between a flange 43 formed in the vicinity of the second joint 5 of the first link 4 and the driving source 9. Additionally, a pulley 52 coaxial with a shaft 51 of the second joint 5 is fixed to the second link 6, the two wires 91a and 91a are wound around the pulley 52 in the direction reverse to each other, and the ends of the wires 91a and 91a are fixed to the pulley 52. In this way, the pulley 52 is rotated by paying out the wire 91a from the driving source 9 and drawing the wire 91a into the driving source 9, and the rotation causes the second link 6 to swing around the shaft 51 of the second joint 5 relative to the first link 4, which bends and stretches the leg links 2L and 2R. Although not shown, an arc-shaped groove is formed on the side surface of the pulley 52 and a protruding portion engaging with the groove is formed in the first link 4 in order to limit the swinging stroke of the second link 6 relative to the first link 4 to a given range.

Figure 6:
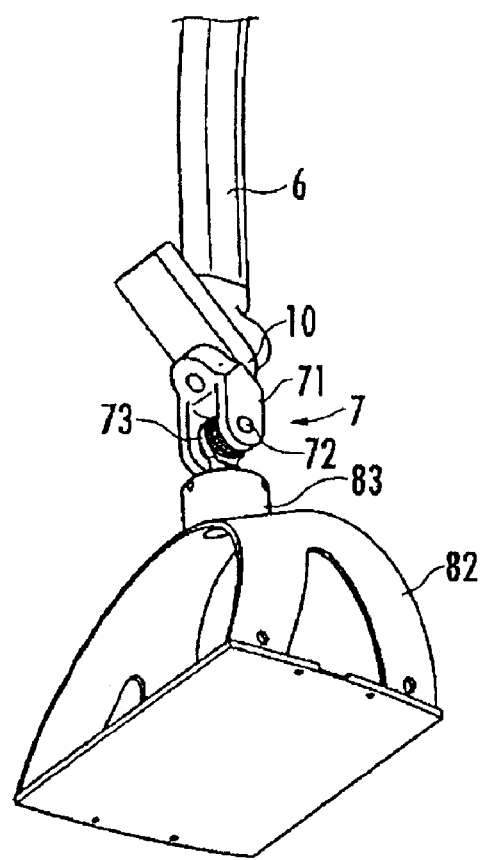
FIG. 6 is a perspective diagram of the lower end of a leg link of the walking aid apparatus according to the first embodiment.

As shown in FIG. 6, the third joint 7 includes a free joint composed of a yoke 71 coupled to the lower end of the second link 6 via a 2-axis force sensor 10 and a moving element 73 coupled to a shaft 72 laterally provided at the lower end of the yoke 71 rotatably and also free to tilt axially. The weight relief assist force described above acts on the line approximately consistent with the reference line L2 between the forward/backward swinging fulcrum 3a of the leg links 2L and 2R in the first joint 3 and the third joint 7, when viewed from the lateral perspective. An actual weight relief assist force (to be exact, a resultant force between the weight relief assist force and the force generated by the weights of the sitting member 1 and the leg links 2L and 2R) acting on the reference line L2 is calculated based on a detected value of the force in the 2-axis direction detected by the force sensor 10.

The landing member 8 includes a shoe 81 and a highly rigid armor coupled ring 82 shown in FIG. 6, which is housed in the shoe 81. A collar 83 is arranged in a standing condition on the upper surface of the coupled ring 82 and the collar 83 is coupled to the lower end of the moving element 73 of the third joint 7. Furthermore, as shown in FIG. 2, an elastic plate 84 to be an insole of the shoe 81 is put on the backside of the coupled ring 82. On the undersurface of the elastic plate 84, there are mounted a pair of front and back pressure sensors 85 and 85 for detecting loads on the metacarpophalangeal joint (MP joint) and the heel of the user's foot.

To control each of the leg links 2R and 2L, the ratio of the load on each foot to the total load on both feet of the user is calculated based on the detected values of the pressure sensors 85 and 85 in each of the landing members 8. Subsequently, a control target value for a weight relief assist force that should be generated in each leg link is calculated by multiplying a preset value of the weight relief assist force by the ratio of the load on each foot. Thereafter, the driving source 9 is controlled in such a way that an actual weight relief assist force calculated based on the detected value of the force sensor 10 is consistent with the control target value. In the one-leg supporting state, the weight relief assist force of the preset value is generated only with the leg link on the side of the supporting leg. In this instance, the driving of the driving source of the leg link on the side of the idling leg is stopped to allow the second joint 5 to be freely rotated. It is also possible to apply a force in the bending direction to the leg link on the side of the idling leg from the driving source to assist the foot of the idling leg in lifting.

The weight relief assist force acts on the line approximately consistent with the line between the spindle 35 as the lateral swinging fulcrum of the first joint 3 and the third joint 7, when viewed from the front. Therefore, a long lateral distance between the spindle 35 and the third joint 7 increases a lateral component of the weight relief assist force and correspondingly a large lateral force acts on the landing member 8 and the sitting member 1. Therefore, in this embodiment, as shown in FIG. 3, the collar 83 on the upper surface of the coupled ring 82 is arranged laterally inside so that the third joint 7 is located laterally inside from the center of the width of the landing member 8. According thereto, the lateral distance between the spindle 35 and the third joint 7 decreases and a smaller lateral force acts on the landing member 8 and the sitting member 1, which improves the stability of the landing member 8 and the sitting member 1.

Figure 7A:
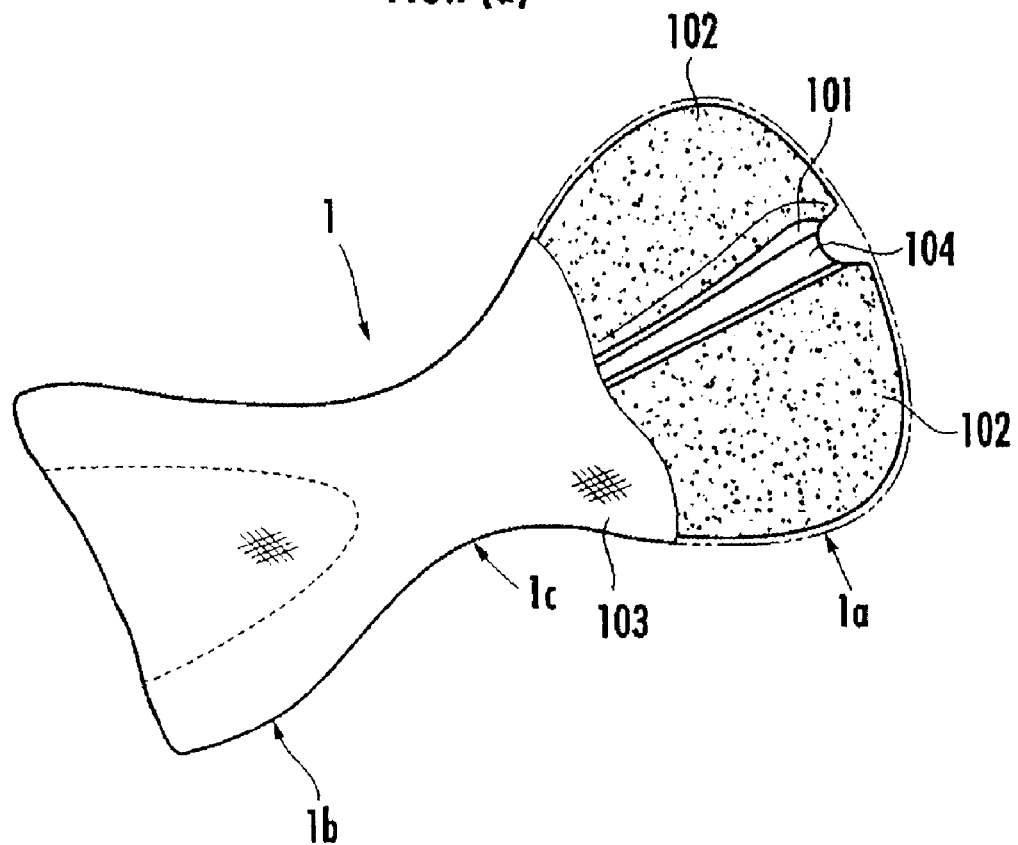
FIG. 7(a) is a perspective diagram of a sitting member of the walking aid apparatus according to the first embodiment and FIG. 7(b) is a perspective diagram of a core of the sitting member.

While various kinds of things have been done to stabilize the sitting member 1 as described above, some thought is also put into the sitting member 1 itself in this embodiment. The thought will be described in detail hereinafter. The sitting member 1 as shown in FIG. 7(a) is formed into a shape having a constricted portion 1c, which is narrower in width than the backside 1a and the foreside 1b, in the anteroposterior middle of the sitting member 1. The foreside 1b is curved upward (See FIG. 2) and is formed in a fork shape with a lateral middle portion cut away. The user sits on the sitting member 1 with his right and left legs positioned laterally on both sides of the constricted portion 1c. According thereto, the wide backside 1a and foreside 1b prevent the sitting member 1 from being misaligned relative to the user in the forward/backward direction and the upward curved foreside 1b avoids the leg swinging forward from hitting against the foreside 1b while walking, thereby securing the degree of freedom in leg motion while walking. Furthermore, the foreside 1b formed in the fork shape facilitates the foreside 1b to flex laterally. Therefore, even if the forward swinging leg abuts the foreside 1b, the flexion of the foreside 1b absorbs the abutment force and the sitting member 1 can be thereby prevented from yawing due to the abutment of the leg. In addition, the user's crotch or the like does not abut the foreside 1b and therefore the sitting member 1 becomes comfortable to sit in. The backside 1a has an enough width to receive the user's right and left ischial bones. Accordingly, the weight relief assist force can be reliably transmitted to the user by means of the contact with the ischial bones.

Figure 7B:
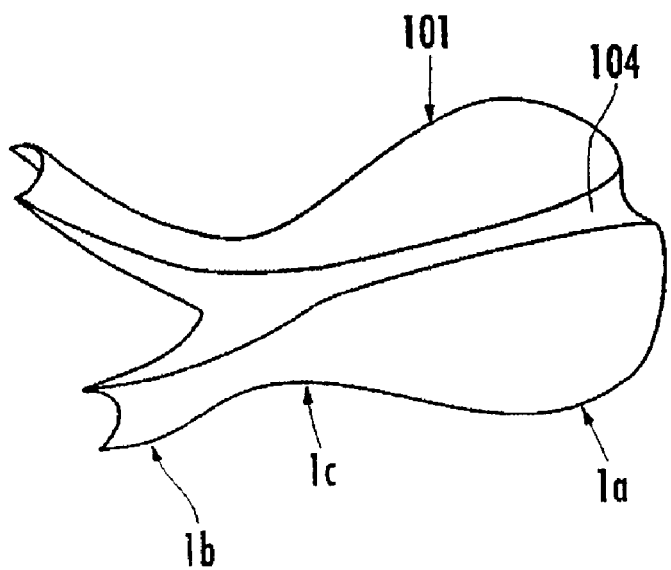

The sitting member 1 includes a core 101 formed of a carbon fiber or the like, a cushioning material 102 put on the upper surface of the core 101, and a cover 103 covering the core 101 and the cushion material 102. The core 101 has a concave portion 104 in the laterally middle of the core 101 extending in the forward/backward direction as shown in FIG. 7(b), with the cushion material 102 put on both sides of the concave portion 104. In addition, the wall thickness of the edge of the core 101 is made thin, so that the abutment forces of the legs from the sides can be flexibly absorbed.

In the meanwhile, in this embodiment, the joint member 31 of the first joint 3 for the left leg link 2L and the joint member 31 of the first joint 3 for the right leg link 2R are pivotally supported by the common spindle 35 so as to be free to swing laterally in order to prevent the sitting member 1 from laterally rolling due to the weight of the leg link on the side of the idling leg in the one-leg supporting state. This, however, allows the sitting member 1 to laterally roll around the spindle 35 in a two-leg supporting state.

Figure 8:
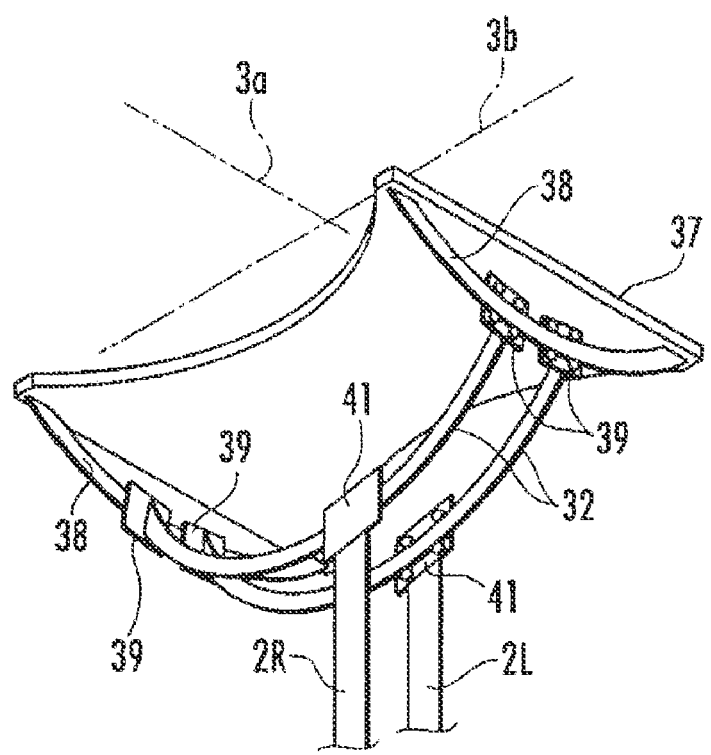
FIG. 8 is a perspective diagram of a first joint according to a second embodiment.

Therefore, in a second embodiment shown in FIG. 8, the first joint 3 is configured as described below to improve the lateral stability of the sitting member 1. More specifically, the slider 41 provided at the upper end of each of the leg links 2L and 2R is movably engaged with each of the arc-shaped first guide tracks 32 longitudinal in the forward/backward direction and having the center of curvature 3a above the sitting member 1 in the same manner as in the first embodiment. Moreover, a support frame 37 for the sitting member provided on the backside of the sitting member 1 is equipped with a pair of front and back second guide tracks 38, each of which is arc-shaped and laterally longitudinal, having the center of curvature 3b above the sitting member 1. Each of the first guide tracks 32 is then movably engaged with the second guide tracks 38 and 38 by means of sliders 39 and 39 at both ends of each of the first guide tracks 32.

According thereto, each of the leg links 2L and 2R swings laterally along the second guide track 38 and the center of curvature 3b of the second guide track 38 is consistent with the lateral swinging fulcrum of the leg links 2L and 2R. Therefore, the lateral swinging fulcrum 3b of the leg links 2L and 2R is located above the sitting member 1. If the action point of the weight of the user's upper body relative to the sitting member 1 is misaligned laterally outward of the lateral swinging fulcrum of the leg links 2L and 2R and the sitting member 1 inclines laterally, the action point of the weight is displaced laterally inward under the lateral swinging fulcrum 3b of the leg links 2L and 2R. Therefore, the lateral distance between the fulcrum 3b and the action point of the weight decreases and thereby the rotation moment acting on the sitting member 1 decreases, too. Thereafter, when the action point of the weight is displaced up to the position just under the lateral swinging fulcrum 3b of the leg links 2L and 2R, the rotation moment acting on the sitting member 1 becomes zero, which stabilizes the sitting member 1 in this state. Accordingly, the sitting member 1 does not largely incline laterally, and the lateral stability of the sitting member 1 is thus improved.

If the forward/backward stability of the sitting member 1 is improved in the structure of the sitting member 1 described above, the first joint 3 can be configured in such a way that only the lateral swinging fulcrum of the leg links 2L and 2R is located above the sitting member 1 by movably engaging a joint member, which is provided with a spindle 35 for pivotally supporting each of the leg links 2L and 2R so as to be free to swing in the forward/backward direction, with the second guide track 38.

Figure 9:
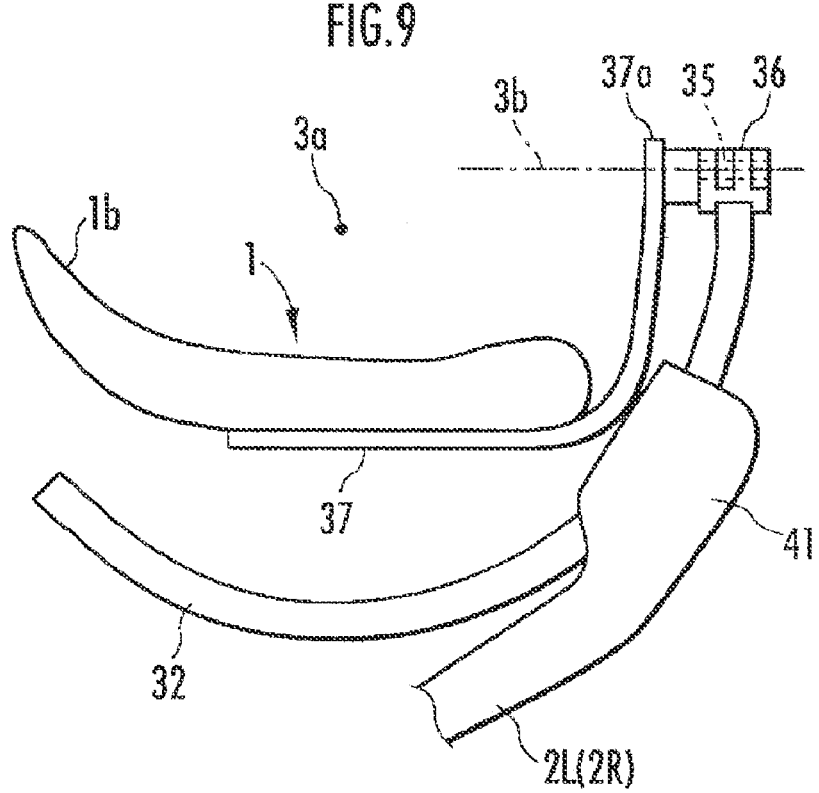
FIG. 9 is a side view of a first joint according to a third embodiment.

Furthermore, the first joint 3 can be configured as in a third embodiment shown in FIG. 9 to bring the lateral swinging fulcrum 3b of the leg links 2L and 2R to be located above the sitting member 1. In the third embodiment, there are provided arc-shaped guide tracks 32, each of which is longitudinal in the forward/backward direction with the center of curvature 3a above the sitting member 1 and with which sliders 41 at the upper end of the leg links 2L and 2R can be movably engaged, in the same manner as in the above embodiment. The third embodiment differs from the above embodiment in that a riser 37a extending higher than the sitting member 1 is formed at the end of the support frame 37 for the sitting member and each of the guide tracks 32 is pivotally supported by a spindle 35 attached to the upper end of the riser 37a so as to be free to swing laterally via a hinge member 36. In this way, the axis line 3b of the spindle 35 to be a lateral swinging fulcrum of the leg links 2L and 2R is located above the sitting member 1.

While the riser 37a is formed at only one end of the support frame 37 in the forward/backward direction such as, for example, only at the back end of the support frame 37, and the guide tracks 32 are supported at one end thereof in the forward/backward direction with open side, it is also possible to form the risers 37a at both ends of the support frame 37 in the forward/backward direction with the guide tracks 32 supported at both ends thereof. If the guide tracks 32 are supported at one end of the guide tracks 32 in the forward/backward direction with open side, however, the weight and cost can be reduced advantageously.

Furthermore, if the foreside 1b of the sitting member 1 is curved upward as described above, the forward/backward swinging fulcrum 3a and the lateral swinging fulcrum 3b of the leg links 2L and 2R can be located lower than the upper end of the foreside 1b of the sitting member 1 as long as they are located higher than the top surface of the middle portion and backside of the sitting member 1 to which the user's weight is applied.

In addition, as in a fourth embodiment shown in FIG. 10, which is a modification of the third embodiment, the axis line 3b (the axis line acting as the lateral swinging fulcrum of the leg link) of a spindle 35, which pivotally supports a guide track 32 so that the guide track 32 is free to swing laterally, can incline relative to the horizontal line in the forward/backward direction. In the fourth embodiment, the axis line 3b inclines forward and downward and is located lower than the foreside 1b in an anteroposterior area corresponding to the foreside 1b of the sitting member 1. In an anteroposterior area corresponding to the middle portion and the backside of the sitting member 1, however, the axis line 3b is located higher than the top surface of the middle portion and the backside of the sitting member 1. This improves the lateral stability of the sitting member 1 in the same manner as in the second and third embodiments. In other words, to improve the lateral stability of the sitting member 1, it is only required that the axis line 3b acting as the lateral swinging fulcrum of the leg link is located higher than the sitting member 1 in the anteroposterior area corresponding to a portion of the sitting member 1 to which the user's weight is applied.

Although the preferred embodiments of the present invention have been described hereinabove with reference to attached drawings, the present invention is not limited to those preferred embodiments. For example, the leg links 2L and 2R can be retractable links each having a direct acting joint in the middle of the link, instead of the freely bending and stretching links each having the rotary joint 5 in the middle of the link as described in the above embodiments. In addition, the landing member 8 can be omitted, and the lower end of each of the leg links 2L and 2R can be fixed to the crus of the user's leg by appropriate means. In this instance, the weight relief assist force is generated by receiving a reaction force at a lower location of the leg at the fixing point of the lower end of the leg link. Furthermore, to assist a user who is lame in one leg due to a fracture of the leg in walking, it is also possible to leave only the leg link on the side of the user's lame leg in the apparatus out of the left and right leg links 2L and 2R in the above embodiments, while omitting the other leg link. In addition, the driving source 9 for the second joint 5 in the middle of each of the leg links 2L and 2R can be mounted on a bracket attached rearward of the sitting member 1, instead of being mounted on each of the leg links 2L and 2R. Furthermore, it is also possible to provide biasing means for biasing the second joint 5 in the stretching direction (the direction of pushing up the sitting member 1), while omitting the driving source 9.

The invention claimed is:

1. A walking aid apparatus comprising a sitting member which a user sits astride and a leg link coupled to a connection provided on an undersurface of the sitting member, wherein:
   the leg link is coupled to the sitting member in such a way as to be free to swing in a forward and backward direction via the connection;
   the connection is adapted in such a way that a forward and backward swinging fulcrum of the leg link is located above the sitting member; and
   the connection includes an arc-shaped guide track longitudinal in the forward and backward direction and having a center of curvature above the sitting member and an upper end of the leg link movably engages with the guide track, by which the center of curvature acts as the forward and backward swinging fulcrum of the leg link.

2. The walking aid apparatus according to claim 1, wherein the leg link is composed of a freely bending and stretching link having a rotary joint in the middle thereof and the upper end of the leg link engages with a portion of the guide track located backward of a line between the joint and the center of curvature of the guide track.

3. The walking aid apparatus according to claim 2, further comprising a driving source for driving the joint.

4. The walking aid apparatus according to claim 1, wherein the leg link includes a joint in the middle thereof and a driving source for driving the joint.

5. The walking aid apparatus according to claim 1, wherein the connection is provided on an undersurface of a portion of the sitting member on which the user sits astride.

6. The walking aid apparatus according to claim 1, wherein the forward and backward swinging fulcrum is located above a portion of the sitting member on which the connection is provided.

7. A walking aid apparatus comprising a sitting member which a user sits astride and a leg link coupled to a connection provided on an undersurface of the sitting member, wherein:
   the leg link is coupled to the sitting member in such a way as to be free to swing in a forward and backward direction and in a lateral direction via the connection;
   the connection is adapted in such a way that a forward and backward swinging fulcrum and a lateral swinging fulcrum of the leg link is located above the sitting member and
   the connection includes an arc-shaped guide track longitudinal in the forward and backward direction and having a center of curvature above the sitting member and an upper end of the leg link movably engages with the guide track, by which the center of curvature acts as the forward and backward swinging fulcrum of the leg link.

8. The walking aid apparatus according to claim 7, wherein the leg link is composed of a freely bending and stretching link having a rotary joint in the middle thereof and the upper end of the leg link engages with a portion of the guide track located backward of a line between the joint and the center of curvature of the guide track.

9. The walking aid apparatus according to claim 8, further comprising a driving source for driving the joint.

10. The walking aid apparatus according to claim 7, wherein the leg link includes a joint in the middle thereof and a driving source for driving the joint.

11. The walking aid apparatus according to claim 7, wherein the connection is provided on an undersurface of a portion of the sitting member on which the user sits astride.

12. The walking aid apparatus according to claim 7, wherein the forward and backward swinging fulcrum and the lateral swinging fulcrum are located above a portion of the sitting member on which the connection is provided.

* * * * *